Patented May 7, 1929.

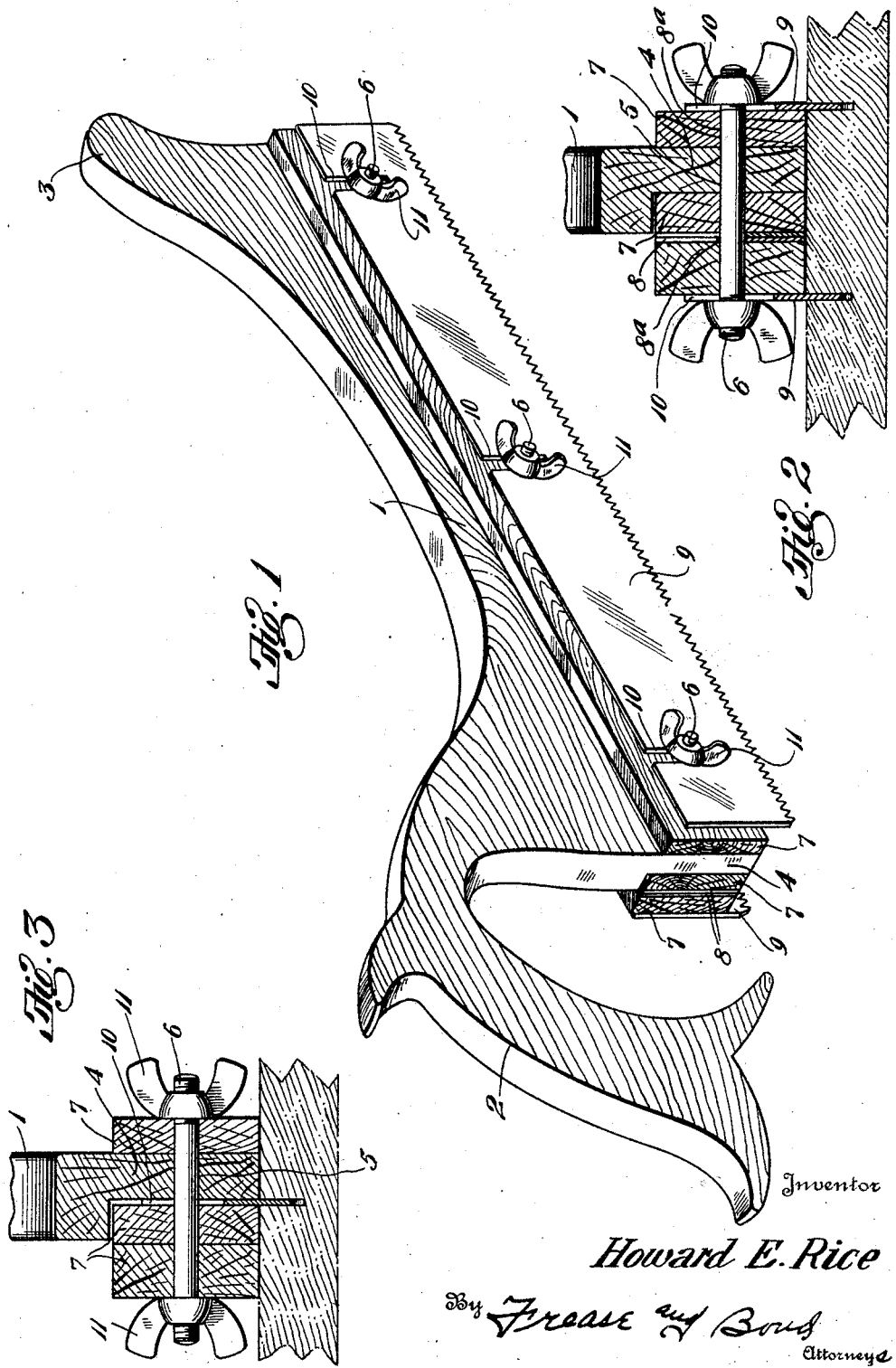

1,712,008

UNITED STATES PATENT OFFICE.

HOWARD E. RICE, OF CANTON, OHIO, ASSIGNOR TO IRWIN E. SCHILLING AND CHRIS DORN, BOTH OF MIAMI, FLORIDA.

SAW.

Application filed March 30, 1925. Serial No. 19,324.

This invention relates to saws, and more particularly to a saw provided with two spaced blades for cutting grooves and the like; and the objects of the invention are to provide a saw of this character having means for adjustably mounting two blades in spaced parallel relation for cutting grooves of various widths; and to provide means whereby a single blade may be mounted in the frame of the saw and longitudinally centered therein; a plurality of interchangeable filler blocks being provided for adjusting the positions of the saw blades.

An embodiment of the invention is illustrated in the accompanying drawing, in which—

Figure 1 is a perspective view of a saw embodying the invention;

Fig. 2, a transverse sectional view through the same; and

Fig. 3, a transverse sectional view of the saw showing one blade longitudinally centered in the frame.

Similar numerals refer to similar parts throughout the drawing.

The improved saw comprises a frame 1, preferably of wood, having the pistol grip handle 2 at its rear end and an upwardly and forwardly extending handle portion 3 at its forward end, whereby the saw may be manipulated by both hands.

The frame 1 is provided at its lower edge with the reduced portion 4 aligned with one side of the frame and of substantially half the thickness of the body portion thereof. Spaced transverse openings 5 are provided through the reduced portion 4 of the frame and receive the double ended screws 6, which are fixed in said openings in any usual or well known manner.

A plurality of filler blocks 7 and plates 8, provided with openings such as the slots 8ª arranged to register with the screws 6, are adapted to be mounted upon the end portions of the screws 6, in any desired arrangement to space the saw blades 9 to cut grooves of various widths.

Each saw blade is provided in its upper portion with vertical slots 10 arranged to register with the screws 6, thumb nuts 11 being provided upon each end of each of the screws to clamp the blades and filler blocks to the frame.

By providing the vertical slots 10 in the blades, it will be seen that the blades may also be adjusted vertically to make a cut of any desired depth and it should be understood that in using the two blades for cutting a groove, the blades may be placed against the outer sides of the filler blocks, as shown in Fig. 2, or may be placed in any intermediate position between the blocks and the frame to cut grooves of different widths.

Where it is desired to use only one saw blade, the same may be mounted between the reduced portion 4 of the frame and the adjacent filler block, as shown in Fig. 3, the blade being thus located substantially at the longitudinal center of the frame, thus placing it directly beneath the handles.

From the above it will be obvious that the saw blades may be readily adjusted toward or from each other, to cut grooves of different widths, by changing the positions of the filler blocks with reference to the saw blades and frame; and the blades may be adjusted vertically, in order to cut grooves of different widths by means of the vertical slots therein.

I claim:—

1. A saw including a frame having a lower reduced portion with one face in a plane passing through the longitudinal center of the frame, double ended screws transversely located through said reduced portion of the frame, a saw blade having open end vertical slots to receive said screws, filler blocks having openings to receive the screws, and nuts upon the double ended screws for clamping the blocks and saw blade to the frame.

2. A saw including a one-piece frame having a lower reduced portion with one face in a plane passing through the longitudinal center of the frame and provided with integral handles at each end of the upper portion of the frame, double ended screws located transversely through said reduced portion of the frame, saw blades having open end vertical slots to receive said screws, interchangeable filler blocks having openings to receive the screws, filler plates having open end vertical slots to receive said screws, said filler plates being interchangeable with the saw blades, and nuts upon the double ended screws for clamping the blocks, plates and saw blades to the frame.

In testimony that I claim the above, I have hereunto subscribed my name.

HOWARD E. RICE.